US012786094B2

(12) United States Patent
Gala et al.

(10) Patent No.: US 12,786,094 B2
(45) Date of Patent: Nov. 3, 2026

(54) SYSTEMS AND METHODS FOR SIMULATING WEB TRAFFIC ASSOCIATED WITH AN UNLAUNCHED WEB FEATURE

(71) Applicant: Netflix, Inc., Los Gatos, CA (US)

(72) Inventors: Shyam Bharat Gala, San Jose, CA (US); Jose Raul Fernandez, San Jose, CA (US); Edward Henry Barker, Sunnyvale, CA (US); Henry Joseph Jacobs, IV, Camas, WA (US); Javier Fernandez-Ivern, Prosper, TX (US); Anup Rokkam Pratap, Campbell, CA (US); Devang Shah, Milpitas, CA (US); Tejas C. Shikhare, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 21 days.

(21) Appl. No.: 18/622,818

(22) Filed: Mar. 29, 2024

(65) Prior Publication Data

US 2024/0364614 A1 Oct. 31, 2024

Related U.S. Application Data

(60) Provisional application No. 63/499,093, filed on Apr. 28, 2023, provisional application No. 63/498,695, filed on Apr. 27, 2023.

(51) Int. Cl.
*H04L 43/55* (2022.01)
*H04N 21/24* (2011.01)

(52) U.S. Cl.
CPC ............ *H04L 43/55* (2022.05); *H04N 21/24* (2013.01)

(58) Field of Classification Search
CPC ..... H04L 43/55; H04N 21/24; G06F 11/3692; G06F 11/3006; G06F 11/3409;
(Continued)

(56) References Cited

U.S. PATENT DOCUMENTS

| | | | | |
|---|---|---|---|---|
| 11,184,269 B1 | 11/2021 | Nee | | |
| 2007/0180325 A1 * | 8/2007 | Bailey | H04L 43/50 714/38.1 | |

(Continued)

OTHER PUBLICATIONS

International Search Report and Written Opinion for International Application No. PCT/US2024/026527, mailed Jul. 24, 2024; 14 pages.

*Primary Examiner* — Rachel J Hackenberg
(74) *Attorney, Agent, or Firm* — Artegis Law Group, LLP

(57) ABSTRACT

A computer-implemented method for simulating web traffic to sandbox-test a new digital content platform service or feature. For example, implementations described herein identify and clone live production traffic from a first route including an existing digital content service. The implementation further forks the cloned production traffic along a second route to a new digital content service. By monitoring and correlating production responses from both the first and second routes, the implementations described herein can analyze and compare performance, accuracy, and correctness of the new digital content service to determine whether the new digital content service can handle live production traffic at scale. Various other methods, systems, and computer-readable media are also disclosed.

20 Claims, 10 Drawing Sheets

(58) Field of Classification Search
CPC ............. G06F 11/3419; G06F 11/3452; G06F 11/3457; G06F 11/3466; G06F 11/3495
See application file for complete search history.

(56) References Cited

U.S. PATENT DOCUMENTS

| | | | | |
|---|---|---|---|---|
| 2015/0381465 | A1* | 12/2015 | Narayanan | H04L 43/062<br>709/224 |
| 2018/0300228 | A1* | 10/2018 | Beyel, III | G06F 11/3688 |
| 2018/0367445 | A1 | 12/2018 | Bajaj | |
| 2020/0051192 | A1 | 2/2020 | Didier | |

* cited by examiner

SYSTEMS AND METHODS FOR SIMULATING WEB TRAFFIC ASSOCIATED WITH AN UNLAUNCHED WEB FEATURE

CROSS-REFERENCE TO RELATED APPLICATIONS

This application claims the benefit of U.S. Provisional Patent Application No. 63/798,695, filed on Apr. 27, 2023, and claims the benefit of U.S. Provisional Patent Application No. 63/499,093, filed Apr. 28, 2023, both of which are incorporated by reference herein in their entirety.

BACKGROUND

Digital content streaming is a popular pastime. Every day, hundreds of millions of users log into streaming platforms expecting uninterrupted and immersive streaming experiences. Streaming digital items to users for playback on their personal devices generally involves a myriad of systems and services. These backend systems are constantly being evolved and optimized to meet and exceed user and product expectations.

Evolving and optimizing backend systems often requires migrating user traffic from one system to another. When undertaking such system migrations, technical issues frequently arise that impact overall platform stability. For example, some streaming platforms include a highly distributed microservices architecture. As such, a service migration tends to happen at multiple points within the service call graph. To illustrate, the service migration can happen on an edge API (application programming interface) system servicing customer devices, between the edge and mid-tier services, or from mid-tiers to datastores. Moreover, such service migrations can happen on APIs that are stateless and idempotent, or can happen on stateful APIs.

Performing a live migration within such a complex architecture is typically fraught with risks. For example, unforeseen issues may crop up and cause user-facing failures and outages. An issue with one service may cascade into other services causing other down-stream problems. Despite this, performing sandbox testing of such service migrations is often difficult for the same reasons that live migrations are risky. Moreover, typical sandbox testing provides no mechanisms to validate responses and to fine-tune the various metrics and alerts that come into play once the system goes live. The complexities of the distributed microservices architecture make any testing scenario computationally burdensome and difficult to verify.

For example, the complexities of the distributed microservices architecture makes it tremendously difficult to verify functional correctness of a new path or route through the architecture. Often traditionally controlled testing coverage fails to allow for all possible user inputs along the new path. As such, new paths commonly go "live" without having been exposed to all the different types of user inputs that may occur in the future. This can lead to negative outcomes at varying levels of severity. Even when a relatively untested path does not contribute to a system failure, the use of testing inputs—as opposed to live traffic—makes it hard to characterize and fine-tune the performance of the system including the new path. In total, existing testing methods use high amounts of computational resources in attempting to only partially test new paths through distributed microservices architecture. When unforeseen bottlenecks, data losses, and other issues and failures later crop up, additional resources must be expended in identifying and fixing the problems along these new paths.

SUMMARY

As will be described in greater detail below, the present disclosure describes implementations that utilize replay production traffic to test digital content service migrations at scale. For example, implementations include cloning production traffic from a first route to an existing digital content service, monitoring live production responses along the first route, forking the cloned production traffic to a new digital content service along a second route, monitoring replay production responses along the second route, and correlating the live production responses and the replay production responses to determine whether the new digital content service can scale to live production traffic.

For example, in some implementations the first route and the second route are within a single service call graph. Additionally, in some implementations, the production traffic from the first route to the existing digital content service includes digital content service requests from a plurality of client devices. In at least one implementation, each of the plurality of client devices is installed with one of a plurality of different digital content service application versions and includes one of a plurality of different device types.

In one or more implementations, forking the cloned production traffic to the new digital content service along the second route includes transmitting the cloned production traffic to the new digital content service along the second route at a same frequency as the production traffic from the first route was transmitting to the existing digital content service along the first route.

Additionally, in at least one implementation, correlating the live production responses and the replay production responses includes identifying live production responses to production traffic items from the first route, identifying replay production responses to production traffic items from the second route, determining pairs of corresponding production traffic items from the first route and cloned production traffic items from the second route, and correlating a live production response and a replay production response corresponding to each pair. Moreover, one or more implementations further include generating an analysis report based on correlating the live production responses and the replay production responses.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including cloning production traffic from a first route to an existing digital content service, monitoring live production responses along the first route, forking the cloned production traffic to a new digital content service along a second route, monitoring replay production responses along the second route, and correlating the live production responses and the replay production responses to determine whether the new digital content service can scale to live production traffic.

In some examples, the above-described method is encoded as computer-readable instructions on a computer-readable medium. In one example, the computer-readable instructions, when executed by at least one processor of a computing device, cause the computing device to clone production traffic from a first route to an existing digital content service, monitor live production responses along the first route, fork the cloned production traffic to a new digital content service along a second route, monitor replay production responses along the second route, and correlate the live production responses and the replay production responses to determine whether the new digital content service can scale to live production traffic.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
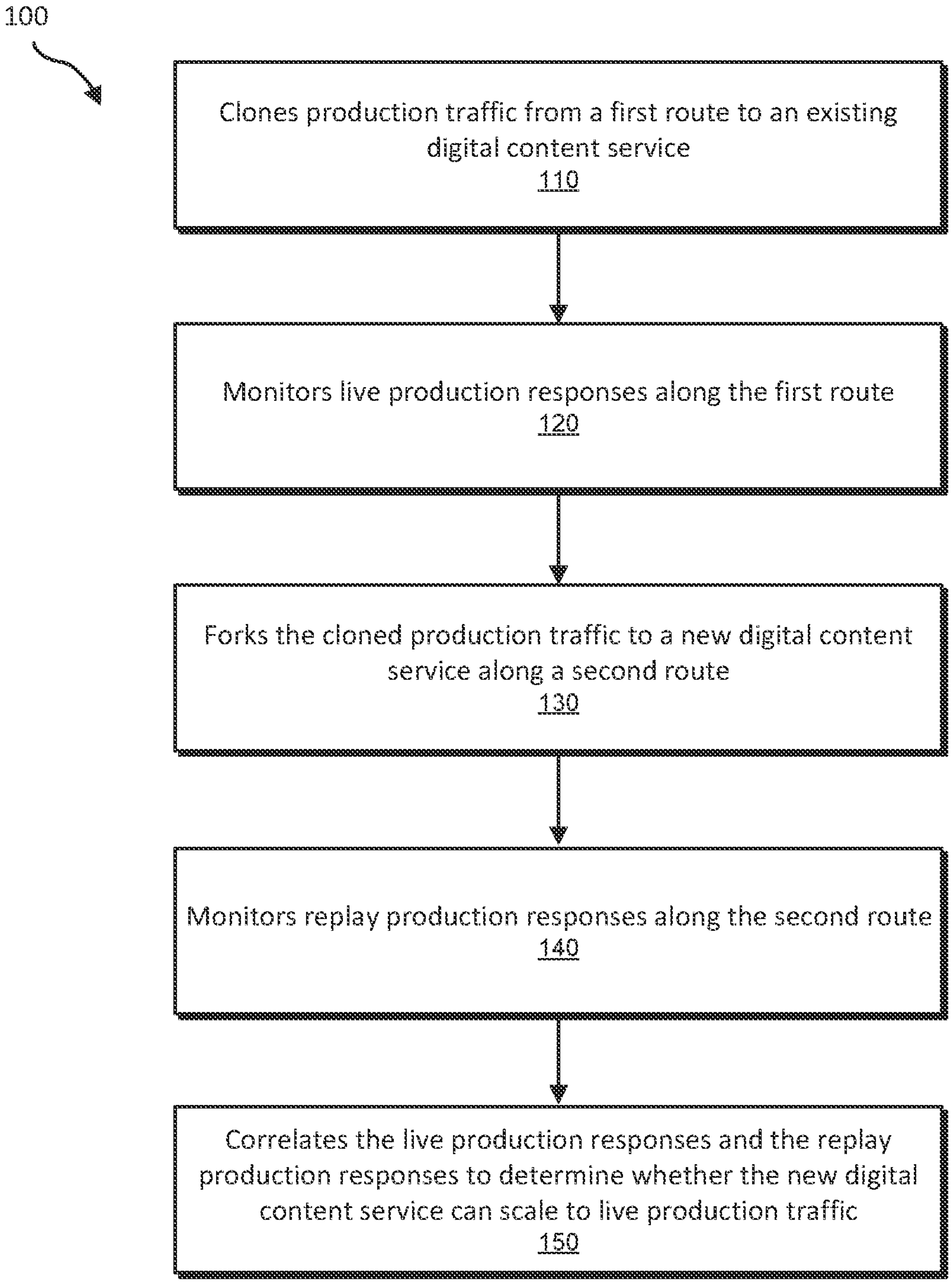
FIG. 1 illustrates a flow diagram of an exemplary computer-implemented method for simulating web traffic associated with an unlaunched web feature in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As discussed above, the complexities of a highly distributed microservices architecture make performing production traffic migrations risky and difficult to test and validate ahead of time. Because of this, streaming platforms that utilize distributed microservices architectures often experience unforeseen bottlenecks, service outages, and other issues when attempting to upgrade, change, or optimize their offerings—such as new web features. Instead, traffic migrations are often undertaken blind because existing tools fail to accurately validate the functional correctness, scalability, and performance of a new service or feature prior to the migration of traffic to that service or feature from another point within the call graph. For example, as mentioned above, existing testing techniques are generally limited to validation and assertion of a very small set of inputs. Moreover, while some existing testing techniques involve automatically generating production requests, these automatically generated requests are not truly representative of actual production traffic-particularly when scaled up to hundreds of millions of users and requests.

In light of this, the present disclosure is generally directed to a system that mitigates the risks of migrating traffic to a new service within a complex distributed microservices architecture while continually monitoring and confirming that crucial metrics are tracked and met at multiple levels during the migration. As will be explained in greater detail below, embodiments of the present disclosure include a replay traffic system that clones live production traffic and forks the cloned production traffic to a new path or route within the service call graph. In one or more examples, the new path includes new or updated systems that can react to the cloned production traffic in a controlled manner. In at least one implementation, the replay traffic system correlates production responses to the live traffic and production responses to the cloned traffic to determine whether the new or updated systems are meeting crucial metrics such as service-level-experience measurements at the user device level, service-level-agreements, and business-level key-performance-indicators.

In this way, the replay traffic system ensures that the technical issues and failures that were previously common to migrations within distributed microservices architectures are alleviated or even eliminated. For example, where previous migrations resulted in service outages and system failures, the replay traffic system goes beyond traditional stress-testing by loading the system using realistic production traffic cloned from live traffic, and by further introducing a comparative analysis phase that allows for a more fine-grained analysis than was previously possible—all under sandboxed conditions. As such, any unforeseen issues that might lead to wasted computational resources are exercised prior to live traffic being migrated to the new service. Additionally, because the replay traffic system utilizes realistic production traffic, it offers a platform whereby responses are accurately validated and metrics and alerts are precisely fine-tuned prior to the migration going live. Thus, the replay traffic system verifies correctness and accuracy in service migrations and ensures the performance of newly introduced services within a larger platform.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
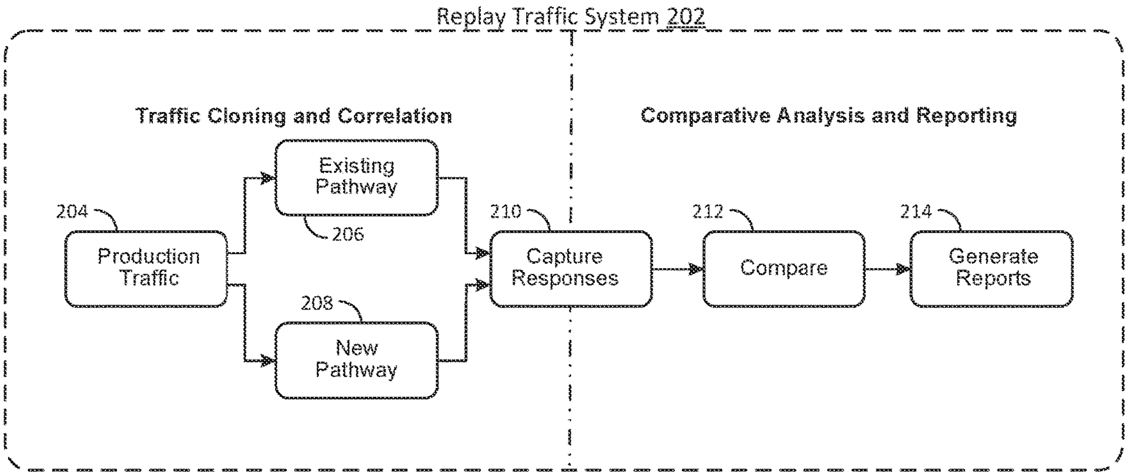
FIG. 2 illustrates an overview of the method for simulating web traffic associated with an unlaunched web feature in accordance with one or more implementations.
Figure 3A:
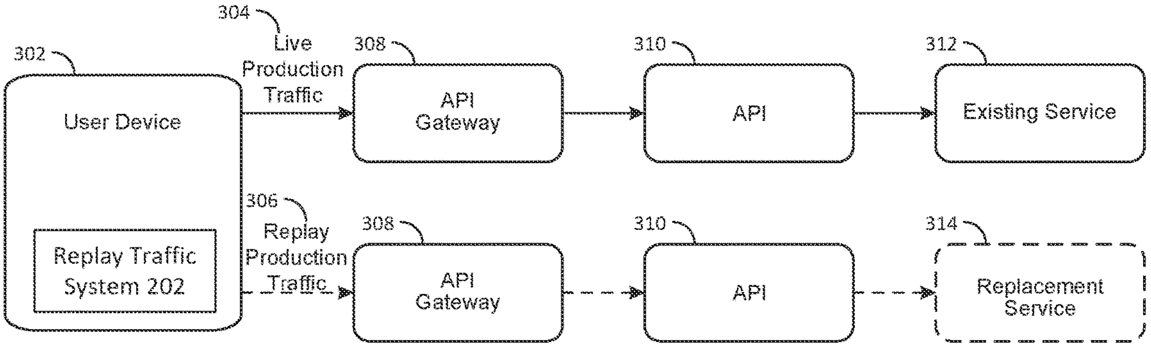
FIGS. 3A-3C illustrate implementations of a replay traffic system cloning production traffic and forking the cloned production traffic to replacement services within a call graph in accordance with one or more implementations.
Figure 3B:
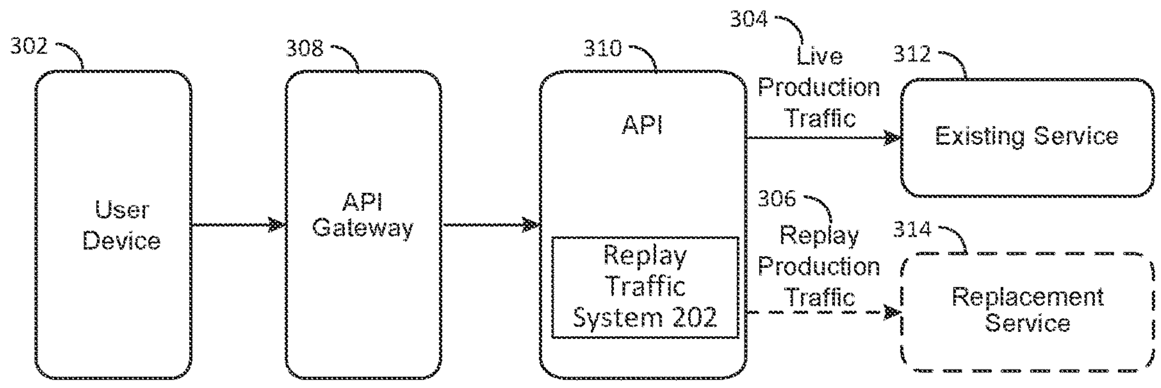
Figure 3C:
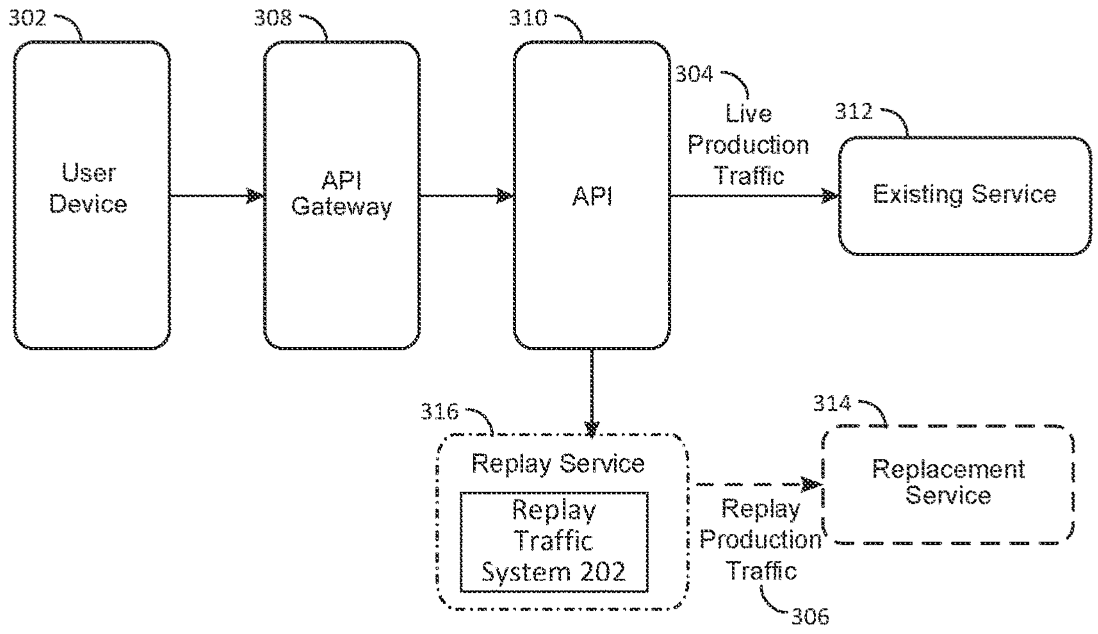
Figure 4:
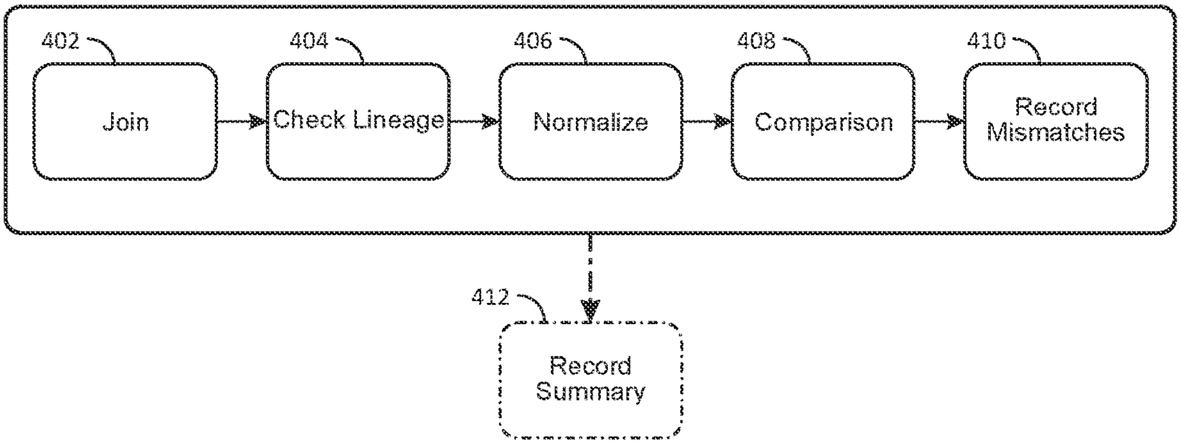
FIG. 4 illustrates an overview of the replay traffic system correlating and analyzing production responses across first and second routes within a call graph in accordance with one or more implementations.
Figure 8:
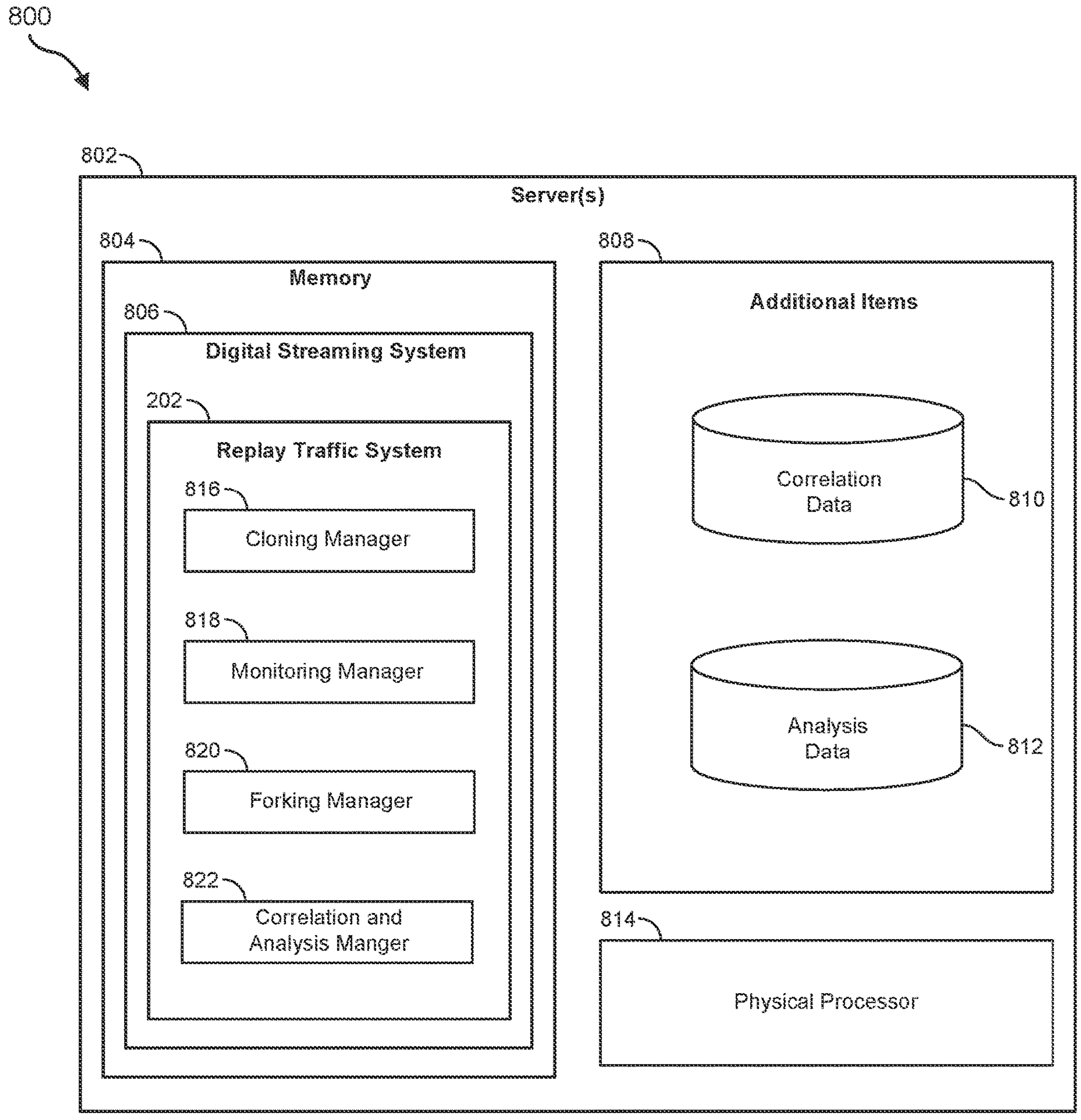
FIG. 8 illustrates an overview of the replay traffic system in accordance with one or more implementations.
Figure 9:
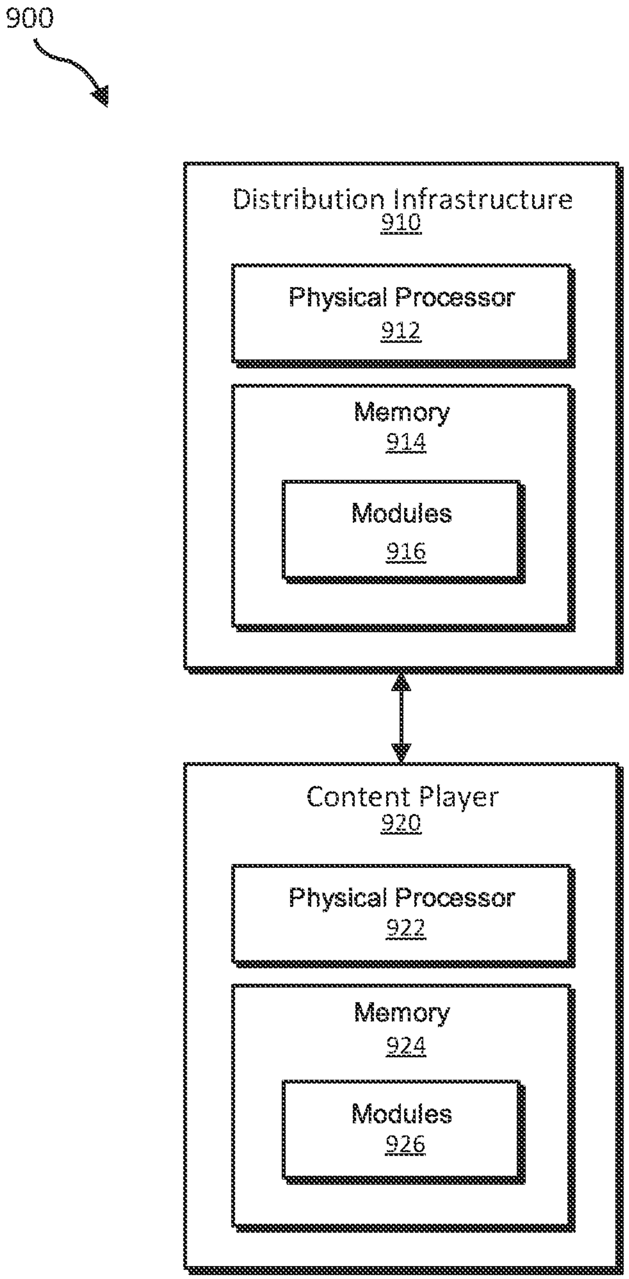
FIG. 9 illustrates a block diagram of an exemplary content distribution ecosystem.
Figure 10:
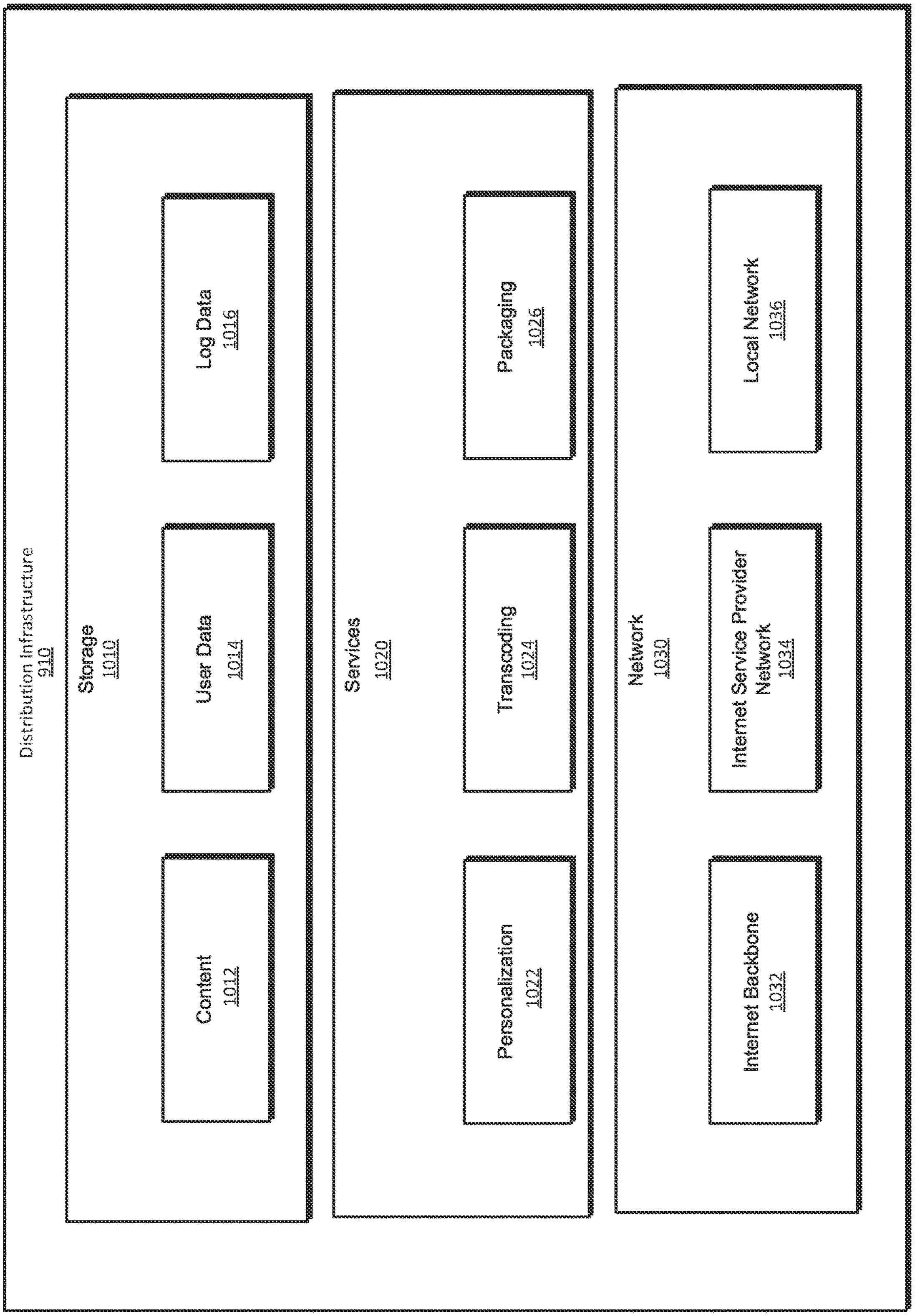
FIG. 10 illustrates a block diagram of an exemplary distribution infrastructure within the content distribution ecosystem shown in FIG. 9.
Figure 11:
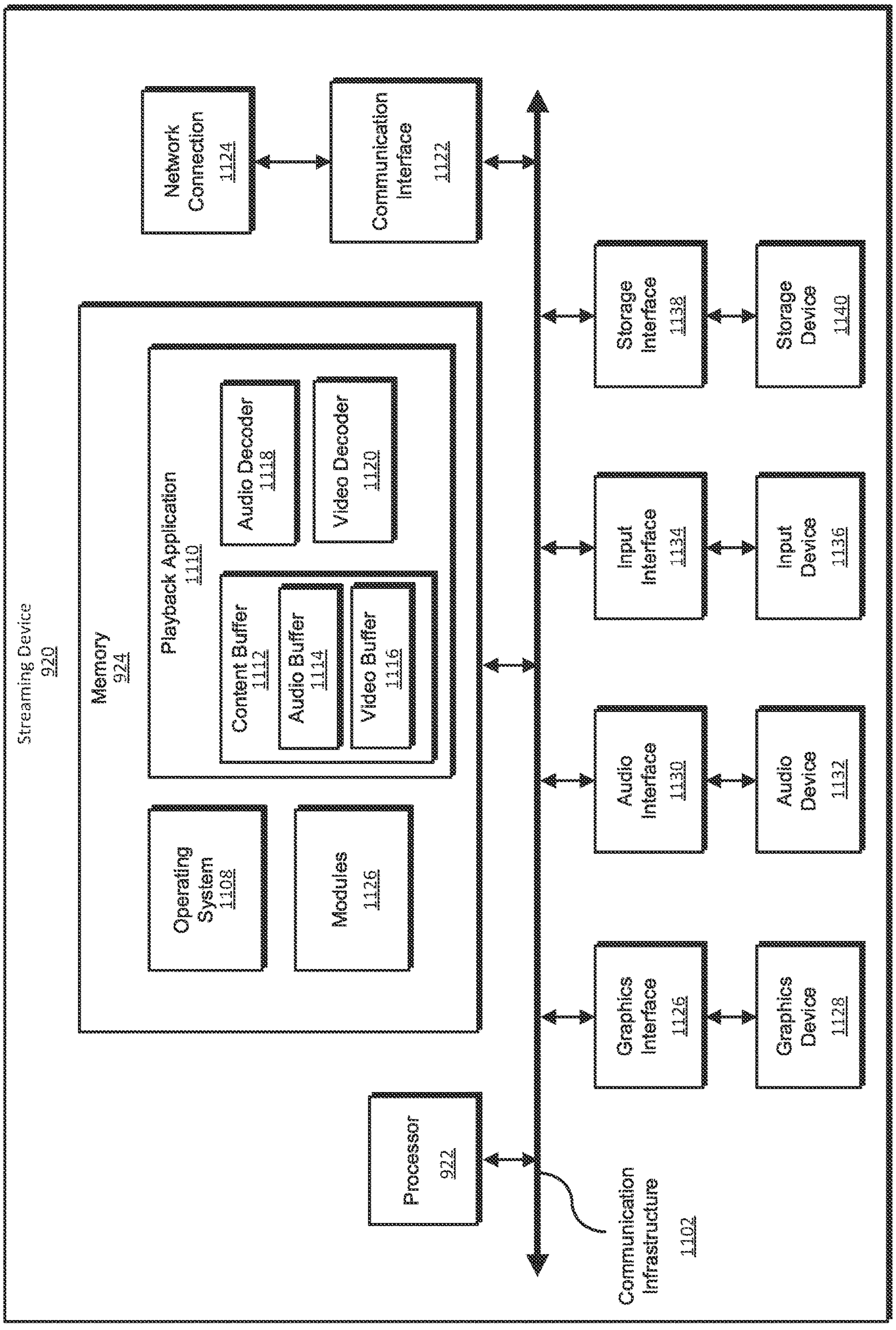
FIG. 11 illustrates a block diagram of an exemplary content player within the content distribution ecosystem shown in FIG. 10.

The following will provide, with reference to FIGS. 1-11, detailed description of a replay traffic system that stress-tests new streaming platform systems and features utilizing cloned production traffic and complex correlation techniques. For example, FIG. 1 illustrates a sequence of steps taken by the replay traffic system in stress-testing a new streaming platform system. FIGS. 2-3C illustrate an overview and implementations of how the replay traffic system performs these stress-tests. FIG. 4 illustrates additional detail with regard to how the replay traffic system correlates production responses from the cloned traffic with production responses from the live traffic in order to generate analyses of the new or replacement system. FIGS. 5A-7 illustrate additional techniques utilized by the replay traffic system in combination with replay traffic testing to further ensure the accuracy of a system migration to a new or replacement system. FIG. 8 illustrates an overview of additional features of the replay traffic system. FIGS. 9-11 illustrate additional detail with regard to a content distribution system (e.g., a digital content streaming platform).

As mentioned above, FIG. 1 is a flow diagram of an exemplary computer-implemented method 100 for utilizing replay traffic testing to determine whether a new digital content service can scale to live production traffic. The steps shown in FIG. 1 may be performed by any suitable computer-executable code and/or computing system, including the system(s) illustrated in FIG. 8. In one example, each of the steps shown in FIG. 1 may represent an algorithm whose structure includes and/or is represented by multiple sub-steps, examples of which will be provided in greater detail below.

As illustrated in FIG. 1, at step 110 the replay traffic system clones production traffic from a first route to an existing digital content service. For example, in one or more implementations, the replay traffic system clones production traffic from the first route by identifying live production items (e.g., system requests made by a client or user device). In at least one implementation, the replay traffic system further duplicates each production item. In one or more examples, the replay traffic system monitors or records the frequency or timing with which the live production items were traveling along the first route to the existing digital content service.

As illustrated in FIG. 1, at step 120 the replay traffic system monitors live production responses along the first route. In one or more examples, the replay traffic system monitors live production responses by identifying production responses from the existing digital content service to the live production items identified along the first route. In most examples, the replay traffic system utilizes a unique identifier (e.g., such as a unique ID associated with the requesting user device) to correlate live production responses to their associated live production items.

As illustrated in FIG. 1, at step 130 the replay traffic system forks the cloned production traffic to a new digital content service along a second route. In one or more examples, the replay traffic system forks the cloned production traffic by transmitting cloned production items along the second route to the new digital content service. In at least one example, the replay traffic system transmits the cloned production items along the second route with the same frequency and/or timing as the corresponding live production items were transmitted along the first route.

As illustrated in FIG. 1, at step 140 the replay traffic system monitors replay production responses along the second route. For example, in one or more implementations, the replay traffic system identifies replay production responses from the new digital content service and correlates those responses with the cloned production items. In at least one implementation, the replay traffic system utilizes a unique identifier to correlate the replay production responses and cloned production items.

As illustrated in FIG. 1, at step 150 the replay traffic system correlates the live production responses and the replay production responses to determine whether the new digital content service can scale to live production traffic. In one or more examples, the replay traffic system again utilizes a unique identifier to determine pairs of corresponding live production items and cloned production items—and their associated production responses. With this information, the replay traffic system generates analyses comparing and contrasting various metrics associated with performance of the existing digital content service and performance of the new digital content service. In at least one implementation, this analysis can indicate whether the new digital content service along the second route is capable of handling live production traffic at scale.

In more detail, FIG. 2 illustrates an overview of the process performed by a replay traffic system 202 in determining whether a new digital content service along a new pathway can scale to live production traffic. For example, in a traffic cloning and correlation phase, the replay traffic system 202 clones production traffic 204 and allows the cloned production traffic 204 to continue along an existing pathway 206 while forking the cloned production traffic along a new pathway 208. In one or more implementations, the replay traffic system 202 clones the production traffic and forks the production traffic along the new pathway 208 in real-time or near real-time. In additional implementations, the replay traffic system 202 monitors and clones the clones production traffic 204 for a predetermined amount of time (e.g., sixty minutes, twelve hours, multiple days or weeks). The replay traffic system 202 then forks the cloned production traffic along the new pathway 208 at the same frequency and in the same order that the cloned production traffic 204 was received and sent out along the existing pathway 206.

The replay traffic system 202 then monitors and captures responses in a step 210. In one or more implementations, the replay traffic system 202 monitors both live production responses along the existing pathway 206 and replay production responses along the new pathway 208. In one or more examples, the replay traffic system 202 correlates the live and replay production responses based on original production traffic items and their clones.

In a comparative analysis and reporting phase, the replay traffic system 202 compares the correlated production responses in a step 212. For example, for a live production item and its clone, the replay traffic system 202 compares the correlated production responses to determine whether the replay production response was more successful, more efficient, more accurate, etc. Finally, at a step 214 the replay traffic system 202 generates one or more reports detailing the results of this comparison.

In one or more examples, the replay traffic system 202 implements the replay traffic solution in any one of multiple ways. FIGS. 3A-3C provide additional detail with regard to each of the different ways the replay traffic system 202 can implement the replay traffic solution. For example, as shown in FIG. 3A, the replay traffic system 202 implements the replay traffic solution on a user device 302 (e.g., a user's smartphone, tablet, smart wearable, laptop, set-top device, smart TV app, etc.). In the example shown in FIG. 3A, the user device 302 (or a streaming platform application installed on the user device 302) makes a request on a production path including an API gateway 308, an API 310, and an existing service 312.

In this configuration, the replay traffic system 202 clones the live production traffic 304 to create cloned replay production traffic 306. In one or more implementations, the replay traffic system 202 executes the replay production traffic 306 along a production path including the API gateway 308, the API 310, and a replacement service 314. For example, the replay traffic system 202 executes the live production traffic 304 and the cloned replay production traffic 306 in parallel to minimize any potential delay on the production path. In at least one implementation, the selection of the replacement service 314 is driven by a URL that the user device 302 uses when making the request or by utilizing specific request parameters in routing logic at the appropriate layer of the service call graph. In one or more implementations, the user device 302 is associated with a unique identifier with identical values on the production path ending in the existing service 312 and on the production path ending with the replacement service 314. In at least one implementation, the replay traffic system 202 uses the unique identifier to correlate live production responses and replay production responses along both production paths. Moreover, in at least one implementation, the replay traffic system 202 records the production responses at the most optimal location in the service call graph or on the user device 302—depending on the migration.

In some examples, the user device driven approach illustrated in FIG. 3A wastes user device resources. There is also a risk of impacting quality-of-experience on low-resource user devices. Moreover, adding forking logic and complexity to the user device 302 can create dependencies on device application release cycles that generally run at a slower cadence than service release cycles, leading to bottlenecks in the migration.

In light of all this, another way that the replay traffic system 202 implements the replay traffic solution is in a server-driven approach. For example, as shown in FIG. 3B, the replay traffic system 202 can implement the replay traffic solution as part of the API 310. In this implementation, the replay traffic system 202 clones and forks the replay production traffic 306 upstream toward the replacement service 314. While implemented as part of the API 310 the replay traffic system 202 calls the existing service 312 and the replacement service 314 concurrently to minimize any latency increase on the respective production paths. In one or more examples, the replay traffic system 202 records the production responses on the path including the existing service 312 and the path including the replacement service 314 along with an identifier with a common value that is used to correlate the live production responses and the replay production responses. In at least one example, the replay traffic system 202 records production responses asynchronously to minimize any impact on the latency on both production paths.

In the implementation illustrated in FIG. 3B, the replay traffic system 202 encapsulates the complexity of the replay logic on the backend without wasting any resources of the user device 302. Moreover, because the replay logic resides on the server-side, any changes can be iterated through more quickly (i.e., without pushing user device updates). Despite this, the illustrated server-driven approach may not be desirable for several reasons. For example, the approach illustrated in FIG. 3B can lead to unnecessary coupling and complexity arising from inserting replay logic alongside other production code.

As such, a preferred implementation is illustrated in FIG. 3C that includes a dedicated service approach. For example, as shown in FIG. 3C, the replay traffic system 202 resides in a dedicated replay service 316. In this approach, the replay traffic system 202 records the live production requests and live production responses along the route from the user device 302 to the existing service 312. Following this, the replay traffic system 202 clones the live production requests and executes the now-cloned production requests against the replacement service 314 (e.g., as replay production traffic 306). The replay traffic system 202 further records the replay production responses along the route to the replacement service 314. In one or more implementations, the replay traffic system 202 correlates the live production responses and the replay production responses (e.g., based on a unique identifier associated with the user device 302), and generates one or more reports based on the correlations.

In this preferred implementation, the replay traffic system 202 centralizes the replay logic in an isolated, dedicated code base. As described above, the approach illustrated in FIG. 3C does not consume the computing resources of the user device 302, nor does it impact quality-of-experience metrics associated with the user device 302. The dedicated service approach illustrated in FIG. 3C also reduces any coupling between production business logic and replay traffic logic.

While a single user device 302 is illustrated in connection with the implementations shown in FIGS. 3A-3C, the replay traffic system 202 monitors and clones production traffic items originating from a large number of user devices during a single experiment. For example, the replay traffic system 202 monitors and clones productions traffic items from different types of user device (e.g., personal computing devices, set top boxes, laptops, etc.), from different digital content service application versions installed on those user devices, across different networks (e.g., the networks connecting the user devices to the API gateway 308, across different geographic areas, across different user demographics, and so forth. As such, each experiment includes cloned production traffic that is representative of a wide range of user devices and other indicators.

In one or more implementations, the replay traffic system 202 performs comparative analysis and generates reports in multiple ways. In some implementations, as shown in FIG. 4, the replay traffic system 202 can perform various preprocessing steps on the live production responses and the replay production responses received and recorded during replay testing. For example, in at least one implementation, the replay traffic system 202 joins live and replay production responses in a step 402. As discussed above, the replay traffic system 202 joins live and replay production responses based on a unique identifier that both types of responses have in common. In some implementations, the unique identifier is associated with the user device 302 where an original production request or production traffic item originates. As such, the unique identifier correlates the production traffic items from the user device 302 and any replay production traffic items that were cloned from those original production traffic items.

In one or more implementations, at a step 404, the replay traffic system 202 checks the lineage of production responses. For example, when comparing production responses, a common source of noise arises from the utilization of non-deterministic or non-idempotent dependency data for generating responses on routes to both the existing service 312 and to the replacement service 314. To illustrate, a response payload may deliver media streams for a playback session on the user device 302. The service responsible for generating this payload may consult a metadata service that provides all available streams for the given title. Various factors can lead to the addition or removal of streams, such as identifying issues with a specific stream, incorporating support for a new language, or introducing a new encoder. Consequently, discrepancies may arise in the sets of streams used to determine payloads on the route to the existing service 312 and on the replay route to the replacement service 314, resulting in divergent responses.

In light of this, the replay traffic system 202 addresses this challenge by compiling a comprehensive summary of data versions or checksums for all dependencies involved in generating a response. In one or more implementations, this summary is referred to as a lineage. The replay traffic system 202 identifies and discards discrepancies by comparing the lineage of both live production responses and replay production responses. In at least one implementation, this approach mitigates impact of noise and ensures accurate and reliable comparisons between the live production responses and correlated replay production responses.

At a step 406, the replay traffic system 202 normalizes live production responses and/or replay production responses. In one or more implementations-depending on the nature of the system being migrated-production responses might need some level of preprocessing before being compared. For example, if some fields in a live production response are timestamps, those fields will differ in a correlated replay production response. Similarly, if there are unsorted lists in a production response, it might be advantageous to sort those lists before comparison. In such cases, the replay traffic system 202 applies specific transformations to the replay production responses to simulate the expected changes.

At a step 408, the replay traffic system 202 compares correlated pairs of live production responses and replay production responses to determine whether the responses in each pair match. For example, following normalization, the replay traffic system 202 checks each pair to determine whether key portions of a live production response and replay production response in a correlated pair match up. In some implementations, the replay traffic system 202 makes this determination utilizing string comparisons, number operations, heuristics, or machine learning.

Following the comparison, at a step 410, the replay traffic system 202 records any mismatches. For example, in some implementations, the replay traffic system 202 creates a high-level summary that captures key comparison metrics. In one or more examples, these metrics include the total number of responses on both routes (e.g., the route to the existing service 312 and the route to the replacement service 314), the count of production responses joined based on the correlation unique identifier, matches and mismatches. In at least one example, the high-level summary also records the number of passing/failing responses on each route—thereby providing a high-level view of the analysis and the overall match rate across the existing and replay routes. Additionally, for mismatches, the replay traffic system 202 records the normalized and unnormalized production responses from both sides to a secondary data table along with other relevant parameters. In some implementations, the replay traffic system 202 uses this additional logging to debug and identify the root causes of issues driving the mismatches. In some examples, this leads to replay testing iterations that reduce the mismatch percentage below a predetermined threshold.

In one or more implementations, the replay traffic system 202 utilizes the results of the steps 402-410 to generate a record summary 412. While the steps 402-410 are illustrated in a given order in FIG. 4, other arrangements are possible. For example, in additional implementations, the replay traffic system 202 joins the production responses in the step 402 and then normalizes the production responses in the step 406 before checking the lineage of the production responses in the step 404.

In some implementations, the replay traffic system 202 records production responses in the record summary 412 and performs the steps illustrated in FIG. 4 offline. In additional implementations, the replay traffic system 202 performs a live comparison. In this approach, the replay traffic system 202 clones and forks the cloned production traffic such as described above with reference to FIG. 3B. The replay traffic system 202 directly compares the live production responses and the replay production responses and records relevant metrics in real-time. This option is feasible when the production response payload lacks complexity, such that the comparison does not significantly increase latencies or if the services being migrated are not on a critical path.

In one or more implementations, the replay traffic system 202 utilizes replay traffic (e.g., clone production traffic) to functionally test new digital content services within a call graph. In additional implementations, the replay traffic system 202 utilizes replay traffic in other ways. For example, in one or more implementations, the replay traffic system 202 utilizes replay traffic to stress test new digital content services. To illustrate, the replay traffic system 202 regulates the load on the route to the replacement service 314 by controlling the amount of cloned production traffic being "replayed" and the horizontal and vertical scale factors of the replacement service 314. This approach allows the replay traffic system 202 to evaluate the performance of the replacement service 314 under different traffic conditions. For example, the replay traffic system 202 can evaluate the availability, and latency of the replacement service 314.

The replay traffic system 202 can also observe how other system performance metrics (e.g., CPU consumption, memory consumption, garbage collection rate, etc.) change as the load factor changes. Utilizing replay traffic to load test the system allows the replay traffic system 202 to identify performance hotspots using actual production traffic profiles. This—in turn—helps expose memory leaks, deadlocks, caching issues, and other system issues. As such, the replay traffic system 202 is enabled to tune thread pools, connection pools, connection timeouts, and other configuration parameters. Further, this load testing approach helps the replay traffic system 202 in determining reasonable scaling policies.

Additionally, the replay traffic system 202 utilizes replay traffic to validate migrations involving stateless and idempotent systems. In one or more implementations, the replay traffic system 202 ensures that the routes to the existing service 312 and the replacement service 314 have distinct and isolated datastores that are in identical states before enabling the replay of production traffic. Additionally, the replay traffic system 202 ensures that all different request types that drive the state machine are replayed (e.g., along the route to the replacement service 314). In the recording step, apart from the production responses, the replay traffic system 202 also captures the state associated with each specific production response. Correspondingly, in the analysis phase, the replay traffic system 202 compares both the production response and the related state in the state machine.

In some examples, given the overall complexity of using replay traffic in combination with stateful systems, the replay traffic system 202 also employs additional techniques to ensure accuracy. For example, in one implementation, the replay traffic system 202 utilizes canaries and sticky canaries to help ensure accuracy during a system migration. Canary deployments are a mechanism for validating changes to a production backend service in a controlled and limited manner, thus mitigating the risk of unforeseen consequences that may arise due to the change.

Figure 5A:
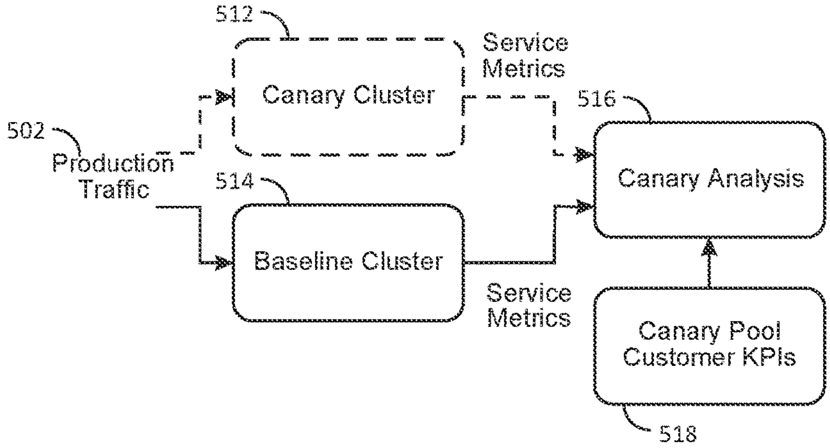
FIGS. 5A and 5B illustrate overviews of "canary" and "sticky canary" techniques utilized by the replay traffic system in accordance with one or more implementations.

In more detail, as shown in FIG. 5A, the replay traffic system 202 creates two new clusters for the replacement service 314; a baseline cluster 514 containing the current version running in production and a canary cluster 512 containing the new version of the service (e.g., the replacement service 314). The replay traffic system 202 redirects a small percentage of the production traffic 502 to the clusters 512, 514, allowing the replay traffic system 202 to monitor performance of the new version of the service and compare that performance against the current version of the service. By collecting and analyzing key performance metrics of the new version of the service over time (e.g., as part of canary analysis 516), the replay traffic system 202 assesses the impact of the new service and determines if those metrics meet canary pool customer KPIs 518 including, but not limited to, availability, latency, and performance requirements.

In some implementations, the replay traffic system 202 further improves the canary process with "sticky canaries." Some product features require a lifecycle of requests between the user device 302 and a set of backend services to drive the features. To illustrate, some video playback functionality involves requesting URLs for the streams from a service, calling the content delivery network to download the bits from the streams, requesting a license to decrypt the streams from a separate service, and sending telemetry indicating the successful start of playback to yet another service. By tracking metrics only at the level of the service being updated (e.g., the replacement service 314), the replay traffic system 202 might miss capturing deviations in broader end-to-end system functionality. "Sticky canaries" can address this limitation.

Figure 5B:
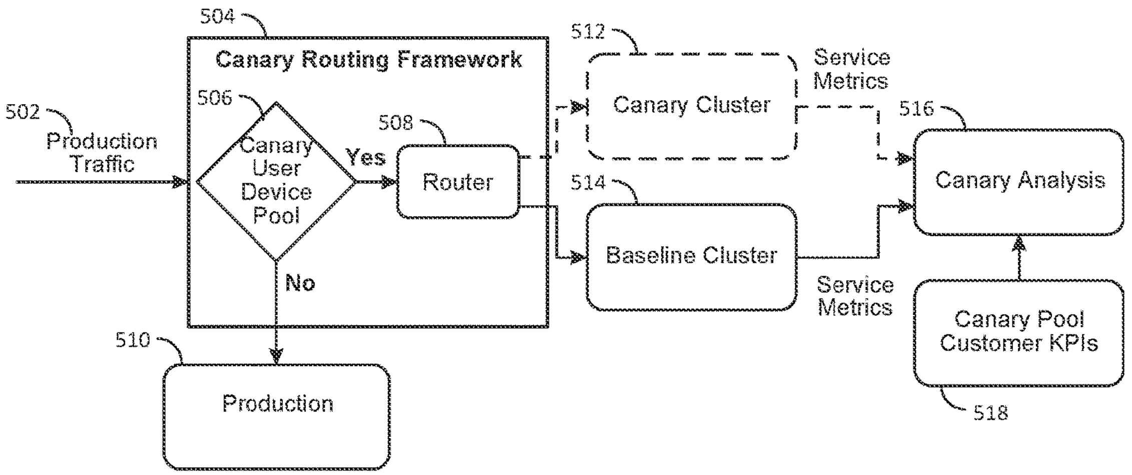

To illustrate, as shown in FIG. 5B, the replay traffic system 202 creates a canary user device pool 506 (e.g., a unique pool of user devices 302 within a canary routing framework 504) and then routes production traffic for this pool consistently to the canary cluster 512 and the baseline cluster 514 (e.g., via a router 508). In one or more implementations, the replay traffic system 202 continues routing devices from the canary user device pool 506 to the clusters 512, 514 for the duration of the experiment. User devices that are not in the canary user device pool 506 are pushed through normal production 510. As seen through canary analysis 516 and canary pool customer KPIs 518, the replay traffic system 202 uses these "sticky canaries" to better keep track of broader system operational and customer metrics across the canary pool and thereby detect regressions on the entire request lifecycle flow.

In additional implementations, the replay traffic system 202 utilizes A/B testing to further ensure the accuracy of system migrations. A/B testing is a method for verifying hypotheses through a controlled experiment. In one or more implementations, an A/B test involves dividing a portion of the population into two or more groups, each receiving a different treatment. The results are then evaluated using specific metrics to determine whether the hypothesis is valid. In at least one implementation, the replay traffic system 202 employs A/B testing to assess hypotheses related to product evolution and user interaction, as well as to test changes to product behavior and customer experience.

In one or more implementations, A/B testing is a valuable tool for assessing significant changes to backend systems. The replay traffic system 202 determines A/B test membership in either device application or backend code and selectively invokes new code paths and services. Within the context of migrations, A/B testing enables the replay traffic system 202 to limit exposure to the migrated system by enabling the new path for a smaller percentage of the membership base—thereby controlling the risk of unexpected behavior resulting from the new changes. In some implementations, the replay traffic system 202 utilizes A/B testing as a key technique in migrations where the updates to the architecture involve changing device contracts as well.

Canary experiments are typically conducted over periods ranging from hours to days. In certain instances, migration-related experiments may span weeks or months to obtain a more accurate understanding of the impact on specific quality of experience (QoE) metrics. Additionally, in-depth analyses of particular business key performance indicators (KPIs) may require longer experiments. Assessing relevant metrics across a considerable sample size is crucial for obtaining a reliable and confident evaluation of the hypothesis. A/B frameworks work as effective tools to accommodate this next step in the confidence-building process.

In addition to supporting extended durations, A/B testing frameworks offer other supplementary capabilities. A/B testing enables the replay traffic system 202 to test allocation restrictions based on factors such as geography, device platforms, and device versions, while also allowing for analysis of migration metrics across similar dimensions. This helps ensure that the changes do not disproportionately impact specific customer segments. A/B testing also provides the replay traffic system 202 with adaptability, permitting adjustments to allocation size throughout the experiment. In one or more implementations, the replay traffic system 202 utilizes A/B testing in connection with migrations in which changes are expected to impact device QoE or business KPIs significantly.

In one or more examples, after completing the various stages of validation, such as replay production testing, sticky canaries, and A/B tests, the replay traffic system 202 has determined that the planned changes will not significantly impact SLAs (service-level-agreement), device level QoE, or business KPIs. Despite this, the replay traffic system 202 carefully regulates the rollout of the replacement service 314 to ensure that any unnoticed and unexpected problems do not arise. To this end, the replay traffic system 202 can implement traffic dialing as the last step in mitigating the risk associated with enabling the replacement service 314.

Figure 6:
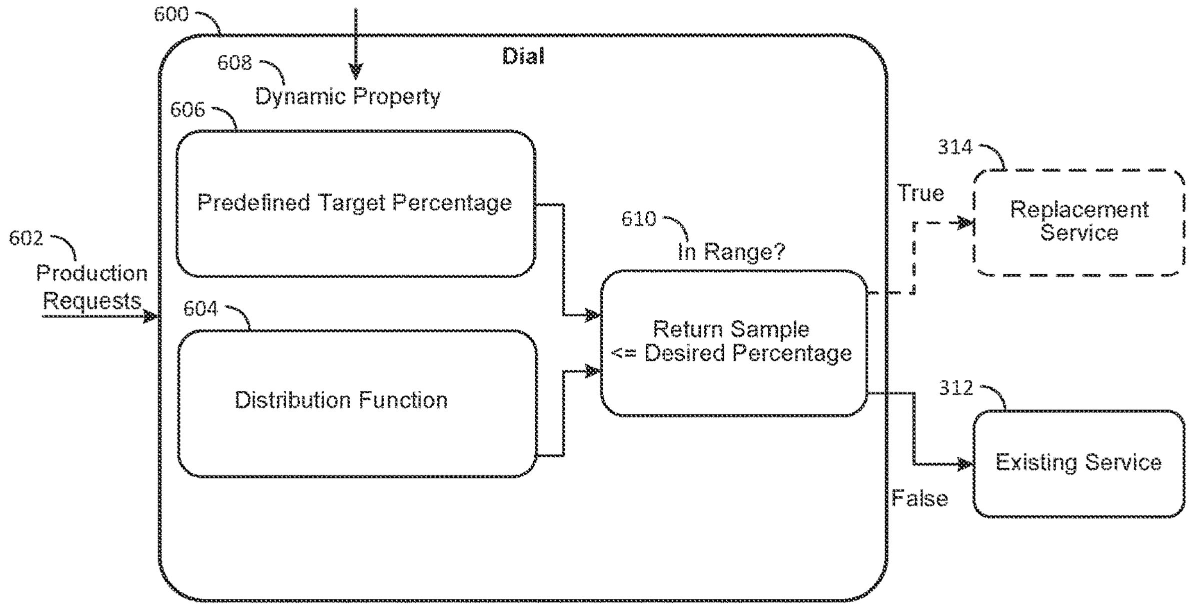
FIG. 6 illustrates an overview of a programmatic dial utilized by the replay traffic system in accordance with one or more implementations.
Figure 7:
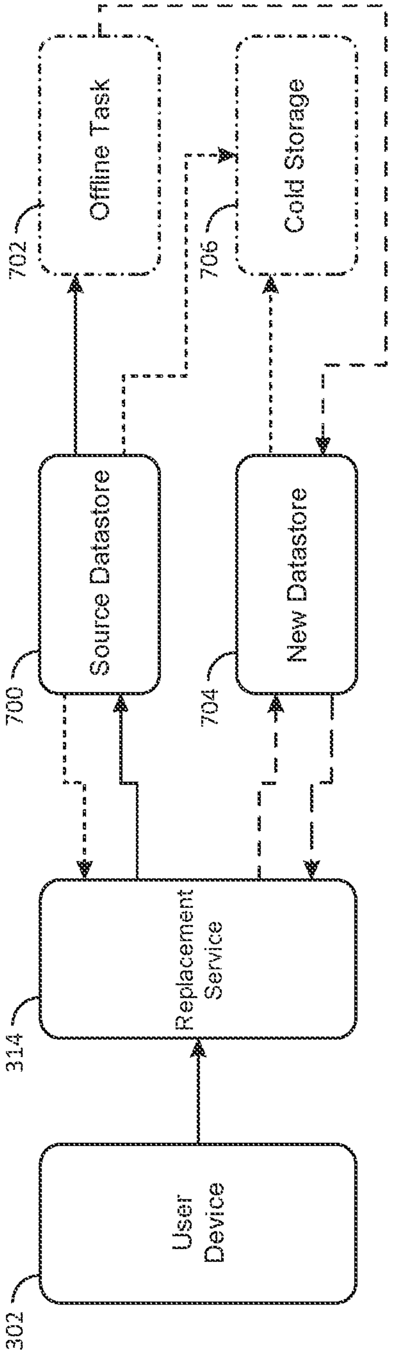
FIG. 7 illustrates an ETL-based dual-write strategy utilized by the replay traffic system in accordance with one or more implementations.

In one or more implementations, a dial is a software construct that enables the controlled flow of traffic within a system. As illustrated in FIG. 6, an example software dial 600 samples inbound production requests 602 using a distribution function 604 and determines whether they should be routed to the new path to the replacement service 314 or kept on the existing path to the existing service 312. The decision-making process involves assessing whether the output of the distribution function 604 aligns within a range 610 of a predefined target percentage 606. The sampling is done consistently using a fixed parameter associated with the request. The target percentage 606 is controlled via a globally scoped dynamic property 608 that can be updated in real-time. By increasing or decreasing the target percentage 606, traffic flow to the new path (i.e., to the replacement service 314) can be regulated instantaneously.

The selection of the actual sampling parameter depends on the specific migration requirements. A dial—such as the software dial 600 illustrated in FIG. 6—can be used to randomly sample all requests, which is achieved by selecting a variable parameter like a timestamp or a random number. Alternatively, in scenarios where the system path must remain constant with respect to customer devices, a constant device attribute such as device Id is selected as the sampling parameter. The replay traffic system 202 can apply a dial in several places, such as device application code, the relevant server component, or even at the API gateway for edge API systems, making them a versatile tool for managing migrations in complex systems. If the replay traffic system 202 discovers unexpected issues or notice metrics trending in an undesired direction during the migration, the dial gives the replay traffic system 202 the capability to quickly roll back the traffic to the old path and address the issue.

The replay traffic system 202 can also scope the dialing steps at the data center level if traffic is served from multiple data centers. The replay traffic system 202 starts by dialing traffic in a single data center to allow for an easier side-by-side comparison of key metrics across data centers, thereby making it easier to observe any deviations in the metrics. The duration of how long the discrete dialing steps are run can also be adjusted. Running the dialing steps for longer periods increases the probability of surfacing issues that may only affect a small group of members or devices and might have been too low to capture and perform shadow traffic analysis. The replay traffic system 202 completes the final step of migrating all the production traffic to the new system using the combination of gradual stepwise dialing and monitoring.

In one or more implementations, stateful APIs pose unique challenges to the replay traffic system 202 that necessitate different strategies. In some implementations, the replay traffic system 202 employs an alternate migration strategy for systems that meet certain criteria—typically systems that are self-contained and immutable, with no relational aspects. In at least one implementation, the replay traffic system 202 adopts an extract-transform-load-based (ETL-based) dual-write strategy according to the following sequence of steps (e.g., illustrated in FIG. 7):

First, in an initial load through an ETL process, the replay traffic system 202 extracts data from a source datastore 700. In an offline task 702, the replay traffic system 202 then transforms the data into the new model, and writes the data to a new datastore 704. In one or more implementations, the replay traffic system 202 uses custom queries to verify the completeness of the migrated records.

Second, the replay traffic system 202 performs continuous migration via dual-writes. For example, the replay traffic system 202 utilizes an active-active/dual-writes strategy to migrate the bulk of the data. In some implementations, as a safety mechanism, the replay traffic system 202 uses dials (discussed previously) to control the proportion of writes that go to the new datastore 704. To maintain state parity across both stores, the replay traffic system 202 writes all state-altering requests of an entity to both the source datastore 700 and the new datastore 704. This is achieved by selecting a sampling parameter that makes the dial sticky to the entity's lifecycle. In some implementations, the replay traffic system 202 incrementally turns the dial up as confidence in the system is gained. The dial also acts as a switch to turn off all writes to the new datastore 704 if necessary.

Third, the replay traffic system 202 continually verifies records. For example, when a record is read, the replacement service 314 reads from both the source datastore 700 and the new datastore 704 and verifies the functional correctness of the new record if found in both the source datastore 700 and the new datastore 704. This comparison may be performed live on the request path or offline based on the latency requirements of the particular use case. In the case of a live comparison, the replay traffic system 202 returns records from the new datastore 704 when the records match. This process gives an idea of the functional correctness of the migration.

Fourth, the replay traffic system 202 evaluates migration completeness. In one or more implementations, to verify the completeness of the records, the replay traffic system 202 utilizes a cold storage 706 to take periodic data dumps from the source datastore 700 and the new datastore 704, which are then compared for completeness.

Lastly, the replay traffic system 202 cuts over production traffic and performs clean-up. For example, once the replay traffic system 202 has verified the data for correctness and completeness, the replay traffic system 202 disables dual writes and reads, cleans up any client code, and ensures that read/writes only occur to the new datastore 704.

In one or more implementations, clean-up of any migration-related code and configuration after the migration is crucial to ensure the system runs smoothly and efficiently. Once the migration is complete and validated, the replay traffic system 202 removes all migration-related code, such as traffic dials, A/B tests, and replay traffic integrations, from the system. This includes cleaning up configuration changes, reverting to the original settings, and disabling any temporary components added during the migration.

As mentioned above, and as shown in FIG. 8, the replay traffic system 202 performs various functions in connection with migrating production traffic at scale with no downtime within the overall system. FIG. 8 is a block diagram 800 of the replay traffic system 202 operating within a memory 804 of a server(s) 802 while performing these functions. As such, FIG. 8 provides additional detail with regard to these functions. For example, in one or more implementations as shown in FIG. 8, the replay traffic system 202 includes a cloning manager 816, a monitoring manager 818, a forking manager 820, and a correlation and analysis manager 822. As further shown in FIG. 8, the server(s) 802 include additional items 808 storing correlation data 810 and analysis data 812.

In one or more implementations, the replay traffic system 202 is part of a digital streaming system 806. In at least one implementation, the digital streaming system 806 streams digital content items (e.g., digital movies, digital TV episodes, digital video games) to user devices. As such, in at least one implementation, the replay traffic system 202 serves to safely test new services within the digital streaming system 806 to determine whether those new services can handle live production traffic at scale.

In certain implementations, the replay traffic system 202 represents one or more software applications, modules, or programs that, when executed by a computing device, may cause the computing device to perform one or more tasks. For example, and as will be described in greater detail below, one or more of the cloning manager 816, the monitoring manager 818, the forking manager 820, and the correlation and analysis manager 822 may represent software stored and configured to run on one or more computing devices, such as the server(s) 802. One or more of the cloning manager 816, the monitoring manager 818, the forking manager 820, or the correlation and analysis manager 822 of the replay traffic system 202 shown in FIG. 8 may also represent all or portions of one or more special purpose computers to perform one or more tasks.

As mentioned above, and as shown in FIG. 8, the replay traffic system 202 includes the cloning manager 816. In one or more implementations, the cloning manager 816 clones or duplicates live production items. In at least one implementation, the cloning manager 816 further monitors and/or records the timing and sequence associated with live production items such that the cloned production items can be transmitted along a different route within the call graph in the same order and with the same timing or frequency.

As mentioned above, and as shown in FIG. 8, the replay traffic system 202 includes the monitoring manager 818. In one or more implementations the monitoring manager 818 monitors production responses to both live production items and cloned production items. In at least one implementation, the monitoring manager 818 associates production items with their responses according to a unique identifier (e.g., a unique ID associated with the user device 302, a unique ID associated with the existing service 312 or the replacement service 314).

As mentioned above, and as shown in FIG. 8, the replay traffic system 202 includes the forking manager 820. In one or more implementations, the forking manager 820 transmits cloned production items down a second route to a replacement service 314 (e.g., a new digital content service). In at least one implementation, the forking manager 820 transmits the cloned production items along the second route in the same order and with the same timing that associated live production items were transmitted along the first route to the existing service 312 (e.g., the existing digital content service).

As mentioned above, and as shown in FIG. 8, the replay traffic system 202 includes the correlation and analysis manager 822. In one or more implementations, the correlation and analysis manager 822 correlates live production responses and cloned production responses and generates analysis of the correlated production responses across a variety of metrics. In at least one implementation, the correlation and analysis manager 822 correlates the production responses across a common identifier mentioned in both—such as a unique identifier associated with the user device 302 where the associated live production item originated.

As shown in FIG. 8, the server(s) 802 includes one or more physical processors, such as the physical processor 814. The physical processor 814 generally represents any type or form of hardware-implemented processing unit capable of interpreting and/or executing computer-readable instructions. In one implementation, the physical processor 814 accesses and/or modifies one or more of the components of the replay traffic system 202. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally as shown in FIG. 8, the server(s) 802 includes the memory 804. In one or more implementations, the memory 804 generally represents any type or form of volatile or non-volatile storage device or medium capable of storing data and/or computer-readable instructions. In one example, the memory 804 stores, loads, and/or maintains one or more of the components of the replay traffic system 202. Examples of the memory 804 includes, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 8, the server(s) 802 includes the additional items 808. On the server(s) 802, the additional items 808 include correlation data 810 and analysis data 812. In one or more implementations, the correlation data 810 includes pairs of live production items and responses and their associated pairs of cloned production items and responses. In one or more implementations, the analysis data 812 includes data utilized by the replay traffic system 202 in generating reports detailing performance of the replacement service 314 (e.g., the new digital content service) across a variety of metrics in comparison with the existing service 312 (e.g., the existing digital content service).

In summary, the replay traffic system 202 provides an accurate and effective methodology for mitigating the risks of migrating production traffic to a new digital content service associated with a streaming platform. As discussed above, the replay traffic system 202 clones live production traffic and forks the cloned production traffic to a new streaming platform service. As such, the new streaming platform service receives realistic production traffic that is representative of requests from a variety and range of client devices, of digital content application versions, network conditions, and so forth. The replay traffic system 202 further monitors and correlates production responses from both the new streaming platform service and the original existing streaming platform service. Based on the correlation, the replay traffic system 202 generates analyses that illustrate how the new streaming platform service performs across a variety of metrics in comparison with the existing streaming platform service. Based on this analysis, the replay traffic system 202 determines whether the new streaming platform service is ready for live production traffic at scale.

The following will provide, with reference to FIG. 9, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-8.

FIG. 9 is a block diagram of a content distribution ecosystem 900 that includes a distribution infrastructure 910 in communication with a content player 920. In some embodiments, distribution infrastructure 910 is configured to encode data at a specific data rate and to transfer the encoded data to content player 920. Content player 920 is configured to receive the encoded data via distribution infrastructure 910 and to decode the data for playback to a user. The data provided by distribution infrastructure 910 includes, for example, audio, video, text, images, animations, interactive content, haptic data, virtual or augmented reality data, location data, gaming data, or any other type of data that is provided via streaming.

Distribution infrastructure 910 generally represents any services, hardware, software, or other infrastructure components configured to deliver content to end users. For example, distribution infrastructure 910 includes content aggregation systems, media transcoding and packaging services, network components, and/or a variety of other types of hardware and software. In some cases, distribution infrastructure 910 is implemented as a highly complex distribution system, a single media server or device, or anything in between. In some examples, regardless of size or complexity, distribution infrastructure 910 includes at least one physical processor 912 and memory 914. One or more modules 916 are stored or loaded into memory 914 to enable adaptive streaming, as discussed herein.

Content player 920 generally represents any type or form of device or system capable of playing audio and/or video content that has been provided over distribution infrastructure 910. Examples of content player 920 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 910, content player 920 includes a physical processor 922, memory 924, and one or more modules 926. Some or all of the adaptive streaming processes described herein is performed or enabled by modules 926, and in some examples, modules 916 of distribution infrastructure 910 coordinate with modules 926 of content player 920 to provide adaptive streaming of digital content.

In certain embodiments, one or more of modules 916 and/or 926 in FIG. 9 represent one or more software applications or programs that, when executed by a computing device, cause the computing device to perform one or more tasks. For example, and as will be described in greater detail below, one or more of modules 916 and 926 represent modules stored and configured to run on one or more general-purpose computing devices. One or more of modules 916 and 926 in FIG. 9 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 912 and 922 generally represent any type or form of hardware-implemented processing unit capable of interpreting and/or executing computer-readable instructions. In one example, physical processors 912 and 922 access and/or modify one or more of modules 916 and 926, respectively. Additionally or alternatively, physical processors 912 and 922 execute one or more of modules 916 and 926 to facilitate adaptive streaming of digital content. Examples of physical processors 912 and 922 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 914 and 924 generally represent any type or form of volatile or non-volatile storage device or medium capable of storing data and/or computer-readable instructions. In one example, memory 914 and/or 924 stores, loads, and/or maintains one or more of modules 916 and 926. Examples of memory 914 and/or 924 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 10 is a block diagram of exemplary components of distribution infrastructure 910 according to certain embodiments. Distribution infrastructure 910 includes storage 1010, services 1020, and a network 1030. Storage 1010 generally represents any device, set of devices, and/or systems capable of storing content for delivery to end users. Storage 1010 includes a central repository with devices capable of storing terabytes or petabytes of data and/or includes distributed storage systems (e.g., appliances that mirror or cache content at Internet interconnect locations to provide faster access to the mirrored content within certain regions). Storage 1010 is also configured in any other suitable manner.

As shown, storage 1010 may store a variety of different items including content 1012, user data 1014, and/or log data 1016. Content 1012 includes television shows, movies, video games, user-generated content, and/or any other suitable type or form of content. User data 1014 includes personally identifiable information (PII), payment information, preference settings, language and accessibility settings, and/or any other information associated with a particular user or content player. Log data 1016 includes viewing history information, network throughput information, and/or any other metrics associated with a user's connection to or interactions with distribution infrastructure 910.

Services 1020 includes personalization services 1022, transcoding services 1024, and/or packaging services 1026. Personalization services 1022 personalize recommendations, content streams, and/or other aspects of a user's experience with distribution infrastructure 910. Transcoding services 1024 compress media at different bitrates which, as described in greater detail below, enable real-time switching between different encodings. Packaging services 1026 package encoded video before deploying it to a delivery network, such as network 1030, for streaming.

Network 1030 generally represents any medium or architecture capable of facilitating communication or data transfer. Network 1030 facilitates communication or data transfer using wireless and/or wired connections. Examples of network 1030 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 10, network 1030 includes an Internet backbone 1032, an internet service provider network 1034, and/or a local network 1036. As discussed in greater detail below, bandwidth limitations and bottlenecks within one or more of these network segments triggers video and/or audio bit rate adjustments.

FIG. 11 is a block diagram of an exemplary implementation of content player 920 of FIG. 9. Content player 920 generally represents any type or form of computing device capable of reading computer-executable instructions. Content player 920 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 11, in addition to processor 922 and memory 924, content player 920 includes a communication infrastructure 1102 and a communication interface 1122 coupled to a network connection 1124. Content player 920 also includes a graphics interface 1126 coupled to a graphics device 1128, an audio interface 1130 coupled to an audio device 1132, an input interface 1134 coupled to an input device 1136, and a storage interface 1138 coupled to a storage device 1140.

Communication infrastructure 1102 generally represents any type or form of infrastructure capable of facilitating communication between one or more components of a computing device. Examples of communication infrastructure 1102 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 924 generally represents any type or form of volatile or non-volatile storage device or medium capable of storing data and/or other computer-readable instructions. In some examples, memory 924 stores and/or loads an operating system 1108 for execution by processor 922. In one example, operating system 1108 includes and/or represents software that manages computer hardware and software resources and/or provides common services to computer programs and/or applications on content player 920.

Operating system 1108 performs various system management functions, such as managing hardware components (e.g., graphics interface 1126, audio interface 1130, input interface 1134, and/or storage interface 1138). Operating system 1108 also provides process and memory management models for playback application 1110. The modules of playback application 1110 includes, for example, a content buffer 1112, an audio decoder 1118, and a video decoder 1120.

Playback application 1110 is configured to retrieve digital content via communication interface 1122 and play the digital content through graphics interface 1126 and audio interface 1130. Graphics interface 1126 is configured to transmit a rendered video signal to graphics device 1128. Audio interface 1130 is configured to transmit a rendered audio signal to audio device 1132. In normal operation, playback application 1110 receives a request from a user to play a specific title or specific content. Playback application 1110 then identifies one or more encoded video and audio streams associated with the requested title.

In one embodiment, playback application 1110 begins downloading the content associated with the requested title by downloading sequence data encoded to the lowest audio and/or video playback bitrates to minimize startup time for playback. The requested digital content file is then downloaded into content buffer 1112, which is configured to serve as a first-in, first-out queue. In one embodiment, each unit of downloaded data includes a unit of video data or a unit of audio data. As units of video data associated with the requested digital content file are downloaded to the content player 920, the units of video data are pushed into the content buffer 1112. Similarly, as units of audio data associated with the requested digital content file are downloaded to the content player 920, the units of audio data are pushed into the content buffer 1112. In one embodiment, the units of video data are stored in video buffer 1116 within content buffer 1112 and the units of audio data are stored in audio buffer 1114 of content buffer 1112.

A video decoder 1120 reads units of video data from video buffer 1116 and outputs the units of video data in a sequence of video frames corresponding in duration to the fixed span of playback time. Reading a unit of video data from video buffer 1116 effectively de-queues the unit of video data from video buffer 1116. The sequence of video frames is then rendered by graphics interface 1126 and transmitted to graphics device 1128 to be displayed to a user.

An audio decoder 1118 reads units of audio data from audio buffer 1114 and outputs the units of audio data as a sequence of audio samples, generally synchronized in time with a sequence of decoded video frames. In one embodiment, the sequence of audio samples is transmitted to audio interface 1130, which converts the sequence of audio samples into an electrical audio signal. The electrical audio signal is then transmitted to a speaker of audio device 1132, which, in response, generates an acoustic output.

In situations where the bandwidth of distribution infrastructure 910 is limited and/or variable, playback application 1110 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1126 is configured to generate frames of video data and transmit the frames of video data to graphics device 1128. In one embodiment, graphics interface 1126 is included as part of an integrated circuit, along with processor 922. Alternatively, graphics interface 1126 is configured as a hardware accelerator that is distinct from (i.e., is not integrated within) a chipset that includes processor 922.

Graphics interface 1126 generally represents any type or form of device configured to forward images for display on graphics device 1128. For example, graphics device 1128 is fabricated using liquid crystal display (LCD) technology, cathode-ray technology, and light-emitting diode (LED) display technology (either organic or inorganic). In some embodiments, graphics device 1128 also includes a virtual reality display and/or an augmented reality display. Graphics device 1128 includes any technically feasible means for generating an image for display. In other words, graphics device 1128 generally represents any type or form of device capable of visually displaying information forwarded by graphics interface 1126.

As illustrated in FIG. 11, content player 920 also includes at least one input device 1136 coupled to communication infrastructure 1102 via input interface 1134. Input device 1136 generally represents any type or form of computing device capable of providing input, either computer or human generated, to content player 920. Examples of input device 1136 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 920 also includes a storage device 1140 coupled to communication infrastructure 1102 via a storage interface 1138. Storage device 1140 generally represents any type or form of storage device or medium capable of storing data and/or other computer-readable instructions. For example, storage device 1140 is a magnetic disk drive, a solid-state drive, an optical disk drive, a flash drive, or the like. Storage interface 1138 generally represents any type or form of interface or device for transferring data between storage device 1140 and other components of content player 920.

EXAMPLE EMBODIMENTS

Example 1: A computer-implemented method for utilizing replay production traffic to test digital content service migrations at scale. For example, the method may include cloning production traffic from a first route to an existing digital content service, monitoring live production responses along the first route, forking the cloned production traffic to a new digital content service along a second route, monitoring replay production responses along the second route, and correlating the live production responses and the replay production responses to determine whether the new digital content service can scale to live production traffic.

Example 2: The computer-implemented method of Example 1, wherein the first route and the second route are within a single service call graph.

Example 3: The computer-implemented method of any of Examples 1 and 2, wherein the production traffic from the first route to the existing digital content service includes digital content service requests from a plurality of client devices.

Example 4: The computer-implemented method of any of Examples 1-3, wherein each of the plurality of client devices is installed with one of a plurality of different digital content service application versions and includes one of a plurality of different device types.

Example 5: The computer-implemented method of any of Examples 1-4, wherein forking the cloned production traffic to the new digital content service along the second route includes transmitting the cloned production traffic to the new digital content service along the second route at a same frequency as the production traffic from the first route was transmitting to the existing digital content service along the first route.

Example 6: The computer-implemented method of any of Examples 1-5, wherein correlating the live production responses and the replay production responses includes identifying live production responses to production traffic items from the first route, identifying replay production responses to production traffic items from the second route, determining pairs of corresponding production traffic items from the first route and cloned production traffic items from the second route, and correlating a live production response and a replay production response corresponding to each pair.

Example 7: The computer-implemented method of any of Examples 1-6, further including generating an analysis report based on correlating the live production responses and the replay production responses.

In some examples, a system may include at least one processor and a physical memory including computer-executable instructions that, when executed by the at least one processor, cause the at least one processor to perform various acts. For example, the computer-executable instructions may cause the at least one processor to perform acts including cloning production traffic from a first route to an existing digital content service, monitoring live production responses along the first route, forking the cloned production traffic to a new digital content service along a second route, monitoring replay production responses along the second route, and correlating the live production responses and the replay production responses to determine whether the new digital content service can scale to live production traffic.

In some examples, a method may be encoded as non-transitory, computer-readable instructions on a computer-readable medium. In one example, the computer-readable instructions, when executed by at least one processor of a computing device, cause the computing device to clone production traffic from a first route to an existing digital content service, monitor live production responses along the first route, fork the cloned production traffic to a new digital content service along a second route, monitor replay production responses along the second route, and correlate the live production responses and the replay production responses to determine whether the new digital content service can scale to live production traffic.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

cloning production traffic from a first route to an existing digital content service;

monitoring live production responses along the first route;

forking the cloned production traffic to a new digital content service along a second route;

monitoring replay production responses along the second route;

correlating the live production responses and the replay production responses based at least in part on one or more unique identifiers shared by the live production responses and the replay production responses;

analyzing a performance of the new digital content service relative to the existing digital content service based at least in part on a match-to-mismatch rate between the live production responses and the replay production responses; and determining whether the new digital content service is able to scale to live production traffic based at least in part on the analysis.

2. The computer-implemented method of claim 1, wherein the first route and the second route are within a single service call graph.

3. The computer-implemented method of claim 1, wherein the production traffic from the first route to the existing digital content service comprises digital content service requests from a plurality of client devices.

4. The computer-implemented method of claim 3, wherein each of the plurality of client devices is installed with one of a plurality of different digital content service application versions and comprises one of a plurality of different device types.

5. The computer-implemented method of claim 1, wherein forking the cloned production traffic to the new digital content service along the second route comprises transmitting the cloned production traffic to the new digital content service along the second route at a same frequency as the production traffic from the first route was transmitting to the existing digital content service along the first route.

6. The computer-implemented method of claim 1, wherein correlating the live production responses and the replay production responses comprises:

identifying live production responses to production traffic items from the first route;

identifying replay production responses to production traffic items from the second route;

determining pairs of corresponding production traffic items from the first route and cloned production traffic items from the second route; and correlating a live production response and a replay production response corresponding to each pair.

7. The computer-implemented method of claim 1, wherein the analysis is further based on at least one of:

a total number of responses on both the first route and the second route;

a count of responses that share the one or more unique identifiers; or a total number of responses that fail on the first route or the second route.

8. The computer-implemented method of claim 1, wherein determining whether the new digital content service is able to scale to live production comprises determining that the new digital content service is able to scale to live production traffic based at least in part on the correlation; and further comprising migrating at least a portion of the live production traffic to the new digital content service via the second route in response to determining that the new digital content service is able to scale to the live production traffic.

9. The computer-implemented method of claim 1, wherein determining whether the new digital content service is able to scale to live production comprises determining that the new digital content service is unable to scale to live production traffic based at least in part on the correlation; and further comprising rolling back the live production traffic from the new digital content service to the existing digital content service in response to determining that the new digital content service is unable to scale to the live production traffic.

10. A system comprising:

at least one physical processor; and physical memory comprising computer-executable instructions that, when executed by the at least one physical processor, cause the at least one physical processor to perform acts comprising:

cloning production traffic from a first route to an existing digital content service;

monitoring live production responses along the first route;

forking the cloned production traffic to a new digital content service along a second route;

monitoring replay production responses along the second route;

correlating the live production responses and the replay production responses based at least in part on one or more unique identifiers shared by the live production responses and the replay production responses;

analyzing a performance of the new digital content service relative to the existing digital content service based at least in part on a match-to-mismatch rate between the live production responses and the replay production responses; and determining whether the new digital content service is able to scale to live production traffic based at least in part on the analysis.

11. The system of claim 10, wherein the first route and the second route are within a single service call graph.

12. The system of claim 10, wherein the production traffic from the first route to the existing digital content service comprises digital content service requests from a plurality of client devices.

13. The system of claim 12, wherein each of the plurality of client devices is installed with one of a plurality of different digital content service application versions and comprises one of a plurality of different device types.

14. The system of claim 10, wherein forking the cloned production traffic to the new digital content service along the second route comprises transmitting the cloned production traffic to the new digital content service along the second route at a same frequency as the production traffic from the first route was transmitting to the existing digital content service along the first route.

15. The system of claim 10, wherein correlating the live production responses and the replay production responses comprises:

identifying live production responses to production traffic items from the first route;

identifying replay production responses to production traffic items from the second route;

determining pairs of corresponding production traffic items from the first route and cloned production traffic items from the second route; and correlating a live production response and a replay production response corresponding to each pair.

16. The system of claim 10, wherein the analysis is further based on at least one of:

a total number of responses on both the first route and the second route;

a count of responses that share the one or more unique identifiers; or a total number of responses that fail on the first route or the second route.

17. A non-transitory computer-readable medium comprising one or more computer-executable instructions that, when executed by at least one processor of a computing device, cause the computing device to:

clone production traffic from a first route to an existing digital content service;

monitor live production responses along the first route;

fork the cloned production traffic to a new digital content service along a second route;

monitor replay production responses along the second route;

correlate the live production responses and the replay production responses based at least in part on one or more unique identifiers shared by the live production responses and the replay production responses;

analyzing a performance of the new digital content service relative to the existing digital content service based at least in part on a match-to-mismatch rate between the live production responses and the replay production responses; and determine whether the new digital content service is able to scale to live production traffic based at least in part on the analysis.

18. The non-transitory computer-readable medium of claim 17, wherein the first route and the second route are within a single service call graph.

19. The non-transitory computer-readable medium of claim 17, wherein the production traffic from the first route to the existing digital content service comprises digital content service requests from a plurality of client devices.

20. The non-transitory computer-readable medium of claim 19, wherein each of the plurality of client devices is installed with one of a plurality of different digital content service application versions and comprises one of a plurality of different device types.

* * * * *